United States Patent

Wershe

[11] Patent Number: 6,109,796
[45] Date of Patent: Aug. 29, 2000

[54] OFF-SET BEARING FOR IN-LINE ROLLER SKATES

[76] Inventor: Richard Wershe, 28020 Elba, St. Clair Shores, Mich. 48081

[21] Appl. No.: 08/890,239

[22] Filed: Jul. 9, 1997

[51] Int. Cl.[7] ............................. F16C 33/58; A63C 17/00
[52] U.S. Cl. ...................... 384/544; 280/11.22; 301/5.7; 384/449; 384/513
[58] Field of Search ...................................... 384/449, 456, 384/490, 504, 513, 514, 515, 516, 543, 544, 546, 477; 280/11.22; 301/5.7

[56] References Cited

U.S. PATENT DOCUMENTS

| | | | |
|---|---|---|---|
| 572,880 | 12/1896 | Flannigain | 384/534 |
| 621,219 | 3/1899 | Burwell | 384/524 |
| 1,420,416 | 6/1922 | Dlesk | 384/477 |
| 2,237,616 | 4/1941 | Smith | 384/477 |
| 2,246,471 | 6/1941 | Searles | 384/477 X |
| 2,467,437 | 4/1949 | Martinec | 301/5.7 |
| 2,610,897 | 9/1952 | Rebmann | 301/5.7 |
| 2,630,356 | 3/1953 | Johnson | 384/477 |
| 2,841,830 | 7/1958 | Burris | 384/546 |
| 2,956,632 | 10/1960 | Forbush et al. | 384/544 X |
| 3,309,155 | 3/1967 | Palmer | 384/544 X |
| 3,837,662 | 9/1974 | Marks et al. | 384/544 X |
| 4,502,738 | 3/1985 | Nauta | 384/477 |
| 4,598,918 | 7/1986 | Rodriquez | 280/11.24 |
| 4,603,868 | 8/1986 | Schutz | 280/11.22 X |
| 4,687,349 | 8/1987 | Pachuta | 384/477 |
| 4,872,771 | 10/1989 | Ueno et al. | 384/492 |
| 4,883,370 | 11/1989 | Nakanishi | 384/490 |
| 4,958,941 | 9/1990 | Imanari | 384/515 X |
| 5,190,301 | 3/1993 | Malewicz | 280/11.22 |
| 5,271,633 | 12/1993 | Hill, Jr. | 280/11.22 |
| 5,330,208 | 7/1994 | Charron et al. | 280/11.22 |
| 5,375,859 | 12/1994 | Peck et al. | 280/11.2 |
| 5,425,585 | 6/1995 | Hoffmann et al. | 384/483 |
| 5,527,050 | 6/1996 | Szendel | 280/11.22 |

Primary Examiner—Thomas R. Hannon
Attorney, Agent, or Firm—Reising, Ethington, Barnes, Kisselle, et al

[57] ABSTRACT

A bearing assembly (35) for in-line roller skates (10) comprises an outer race (42) having an inner diameter surface (47) with an exterior end (38) and an interior end (41). The inner diameter surface (47) has an annular groove (46) with its annular center (50) offset from a midpoint (52) of the outer race (42). The assembly (35) also comprises an inner race (37) that is concentric with the outer race (42). The inner race (37) has an outer diameter surface (45), an exterior end (39), and an interior end (43). The outer diameter surface (45) has a second annular groove (44) with its annular center (50) offset from a midpoint (52) of the inner race (37). The second annular groove (44) of the inner race (37) is aligned with the annular groove (46) of the outer race (42) and a plurality of bearings (40) are disposed therebetween. A bearing retaining cage (54) is provided at the interior ends (41,43) of the races (37,40) to retain the bearings (40) in a spaced apart relationship. A sealing cap (55) is provided between the inner (37) and outer (42) races at the exterior ends (39,38) of the races (37,42).

6 Claims, 3 Drawing Sheets

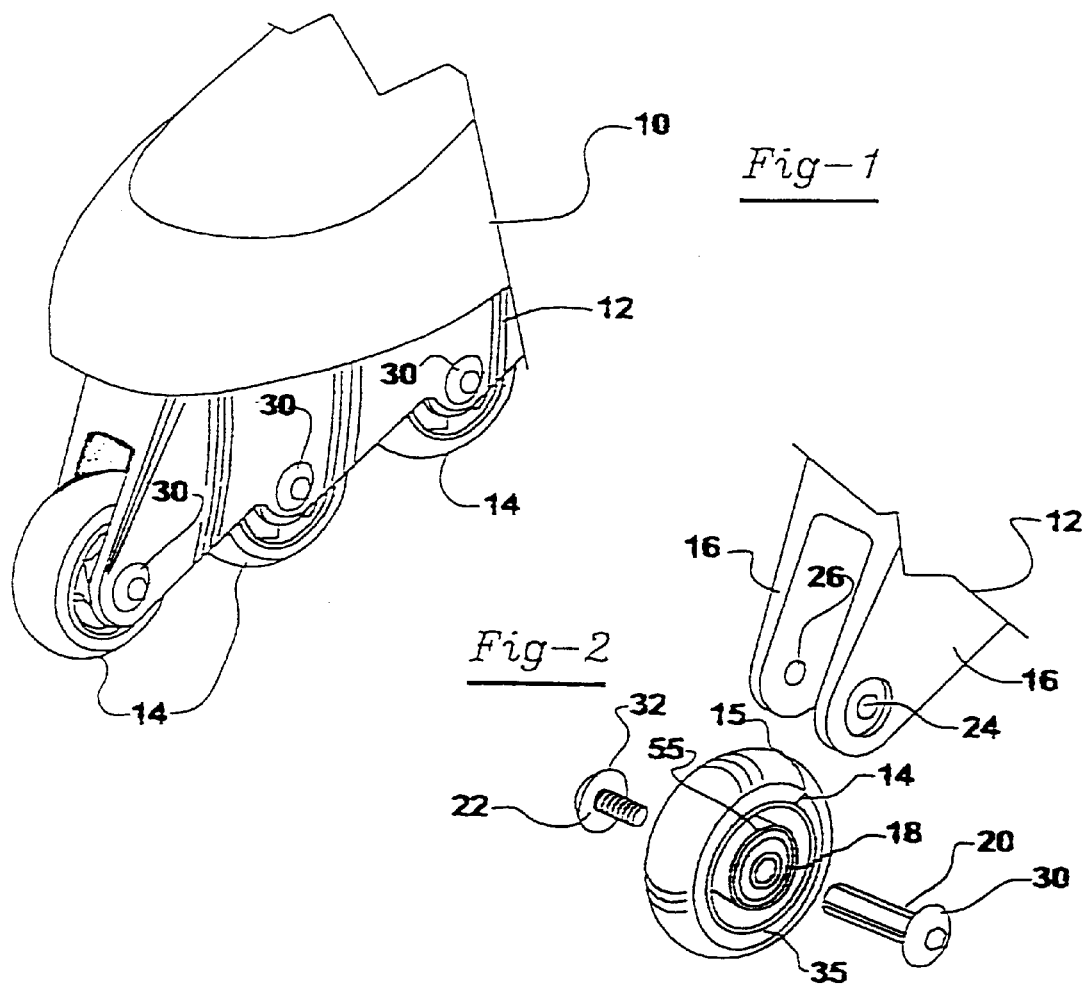
Fig-1
Fig-2
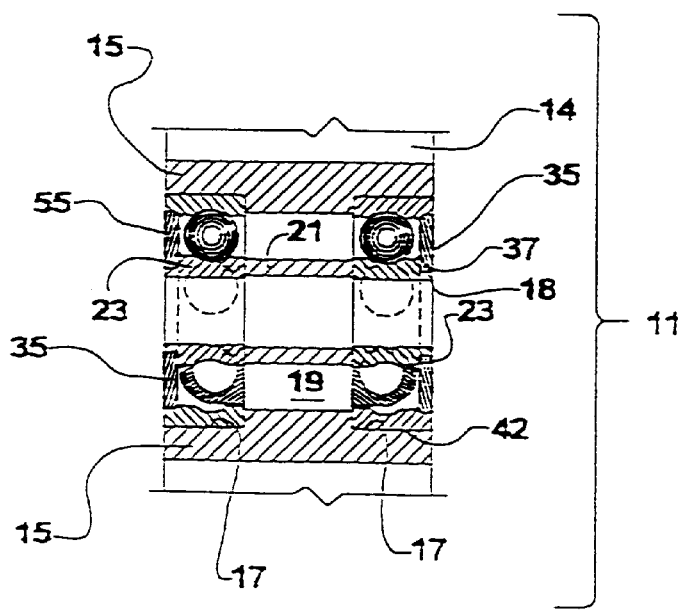
Fig-3

OFF-SET BEARING FOR IN-LINE ROLLER SKATES

TECHNICAL FIELD

This invention relates to bearing assemblies for wheels. More specifically, this invention relates to further improvements in ball bearing constructions for in-line roller skates and skateboards.

BACKGROUND ART

In-line roller skates and skateboards have seen great popularity. Part of the popularity is due in part to vastly improved bearings that provide less friction and more rolling of the skate wheel to decrease the effort to propel oneself and make the sport more enjoyable. However, typical bearing assembly construction has limited performance by confining the bearing to an area defined by its interior and exterior ends and by centering the bearings within that area.

It is desirable that bearing assemblies be developed which obtain larger bearings while utilizing fewer bearings thereby increasing performance.

SUMMARY OF THE DISCLOSURE

According to the present invention there is provided a bearing assembly of the type for use in wheels for in-line roller skates. The assembly comprises an outer race having an inner diameter surface, an exterior end, and an interior end. The inner diameter surface has an annular groove with its annular center offset from a midpoint of the outer race. The assembly also comprises an inner race that is concentric with the outer race. The inner race has an outer diameter surface, an exterior end, and an interior end. The outer diameter surface has a second annular groove with its annular center offset from a midpoint of the inner race. The second annular groove of the inner race is in aligned with the annular groove of the outer race and a plurality of bearings are disposed therebetween.

The bearing assembly further comprises a bearing retaining cage at the interior ends of the races to retain the bearings in a spaced apart relationship. A sealing cap is provided between the inner and outer races at the exterior ends of the races.

In accordance with a broad aspect of the present invention, the performance of the wheel bearing assemblies used in in-line roller skates is increased by having the center of the bearings offset from the midpoint of the inner and outer races so that a larger diameter bearing balls may be installed. Larger diameter balls provide for more mass in motion, less frictional drag, and allows deeper races for greater side load capacity. The deeper inner race allows the ball to be closer to its central axle which thereby renders the ball less travel per revolutions about the axle. The offset position of the increased diameter ball bearings do not cause any other undesirable interference with the exterior sealing cap or other degradation of the ball bearing assembly. The offset design allows for a decrease of the number of balls from the conventional seven or eight balls to five or six balls therefore decreasing the number of parts and complexity of the bearing assembly construction. Also the interior sealing caps of the wheel bearing assembly can be eliminated if desired for ease of cleaning.

BRIEF DESCRIPTION OF THE DRAWINGS

Reference is now made to the accompanying drawings in which:

FIG. 1 is a fragmentary perspective view of an in-line skate incorporating a bearing according to the invention;

FIG. 2 is an exploded view of the skate shown in FIG. 1;

FIG. 3 is a segmented view of one wheel and its bearing assemblies;

DETAILED DESCRIPTION OF THE DRAWINGS

Figure 6:
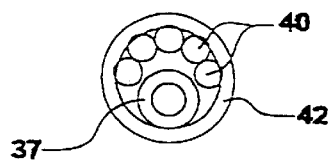
FIG. 6 is a side elevational view illustrating the assembly of the bearings in its races.

As shown in FIGS. 1 and 2, an in-line skate 10 has a wheel support bracket 12 holding wheels 14. The bracket 12 includes two flanges 16 spaced apart to fit wheel 14 and its centerbearing spacer 18 therebetween. The centerbearing spacer 18 is mounted between the flanges 16 via axle pin 20 with head 30 engaging one flange 16 and an opposing threaded fastener 22 with its head 32 engaging the opposing flange 16. The wheel 14 is able to rotate with respect to the mounted pin 20 by a set of ball bearing assemblies 35.

The wheel 14 includes a hub 15 having a pair of opposing annular bearing recesses 17. Disposed between the annular bearing recesses 17 is an interior space 19. Centerbearing 18 has a raised center portion 21 and distal ends 23. The bearing assemblies 35 abut center portion 21 and are concentric with distal ends 23. A bearing assembly 35 is positioned in each annular bearing recess 17 with the centerbearing spacer 18 disposed between the bearing assemblies 35 and within the interior space 19.

Figure 4:
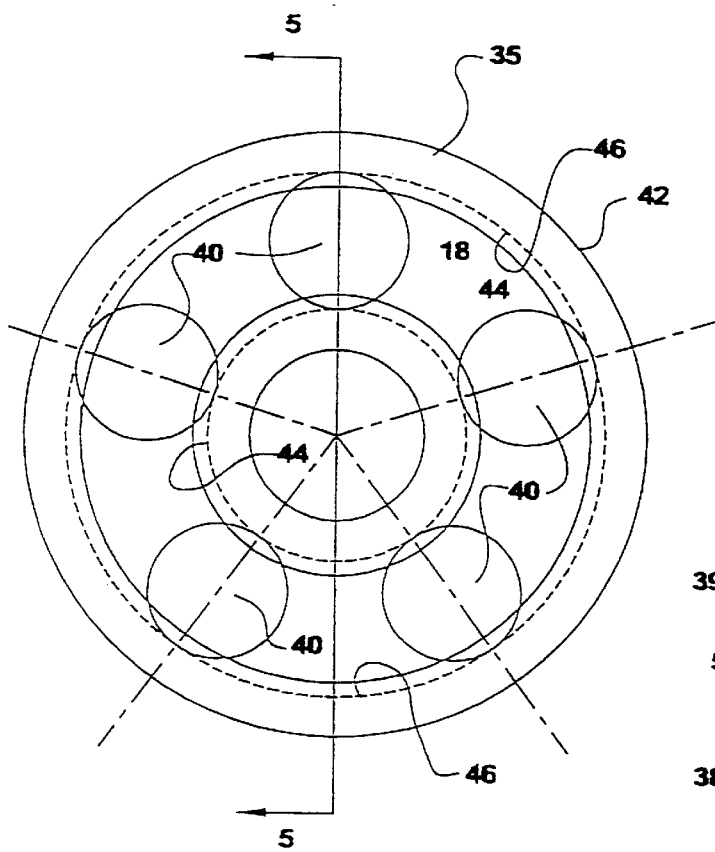
FIG. 4 is a side elevational view of the bearing shown in FIG. 1.
Figure 5:
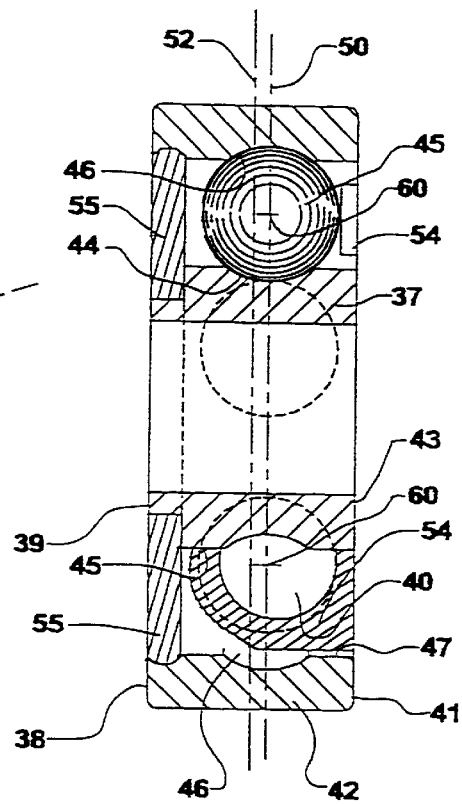
FIG. 5 is a cross sectional view taken along lines 5—5 shown in FIG. 4.

As shown in FIG. 3 and 4, the bearing assembly 35 has an outer race 42 and a concentric inner race 37. As shown in FIG. 5, the outer race 42 and inner race 37 have interior ends 41,43 and exterior ends 38,39, respectively. The inner race 37 and outer race 42 have outer diameter surface 45 and inner diameter surface 47, respectively. Inner diameter surface 47 includes annular grooves 46 and outer diameter surface 45 includes second annular groove 44. The annular grooves 44,46 have a central axis 50 offset or spaced from the midpoint 52 of the races 37,42 and towards the interior ends of the races 37 and 42. It is to be understood that the midpoints of the races 37,42 do not have to be in alignment. Rather, it is only important that the central axis 50 of the annular grooves 44,46 are positioned farther away from the exterior ends 38,39 of the races 37,42 than from the interior ends 41,43 of the races 37,42.

As shown in FIG. 4, ball bearings 40 are captured in the annular grooves 44 and 46. The ball bearings 40 are spherical in shape with their centers 60 also aligned with axis 50 and being offset or spaced from midpoint 52.

Figure 7:
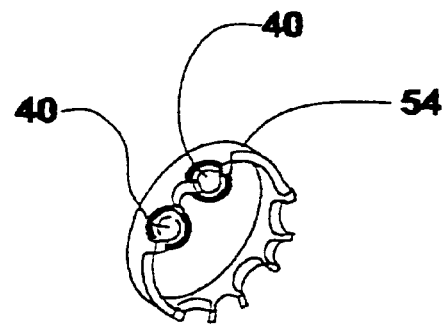
FIG. 7 is an perspective view of one of the bearing assemblies illustrating the bearing retaining cage.

The ball bearings 40 are retained in their circumferential positions by a commercially available bearing retaining cage 54 snap fitted into place about the ball bearings 40, shown in FIG. 7, at the interior ends 41,43 of the bearing assembly 35.

Figure 9:
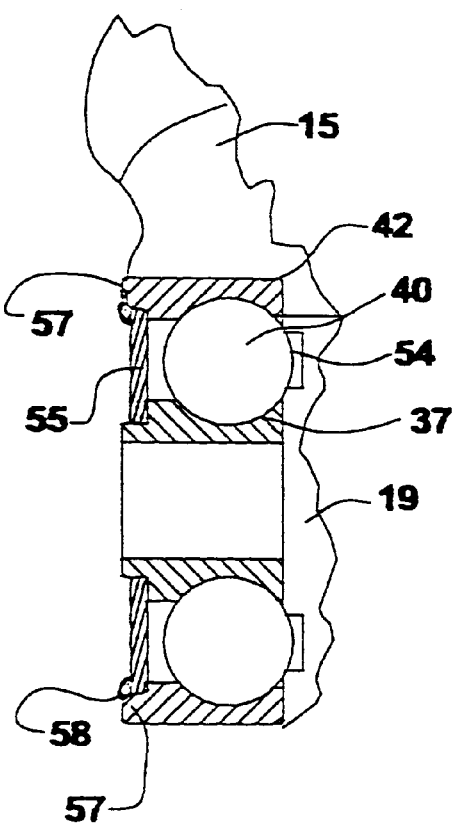
FIG. 9 is a cross sectional view taken along lines 5—5 of FIG. 4 illustrating a retaining clip and sealing cap and the spherical surfaces of the ball bearings protruding into the interior space.

Annular notches 62,64 are located where exterior ends 38,39 intersect inner diameter surface 47 and outer diameter surface 45, respectively. An annular plate-shaped sealing cap 55 is seated in annular notches 62,64. The sealing cap 55 may be a unitary piece with prongs 56 that engage the surfaces 45,47 of the races 37,42. Also, the sealing cap 55 may be of a two piece construction typically used in the art, as shown in FIG. 9. The inner diameter surface 47 of the exterior end 38 of the outer race 42 has an annular recess 57. The sealing cap 55 is disposed between the inner race 37 and outer race 42. A retaining clip 58 is inserted into the annular recess 57 thereby securing the sealing cap 55 to the outer race 42.

To insert the ball bearings 40 during assembly, as illustrated in FIG. 6, the ball bearings 40 are circumferentially positioned to one side of the outer race 42 to allow the inner race 37 to be inserted into the outer race 42. The ball bearings 40 are then circumferentially moved to their positions, shown in FIG. 4, and the bearing retaining cage 54 is then snapped into place.

Figure 8:
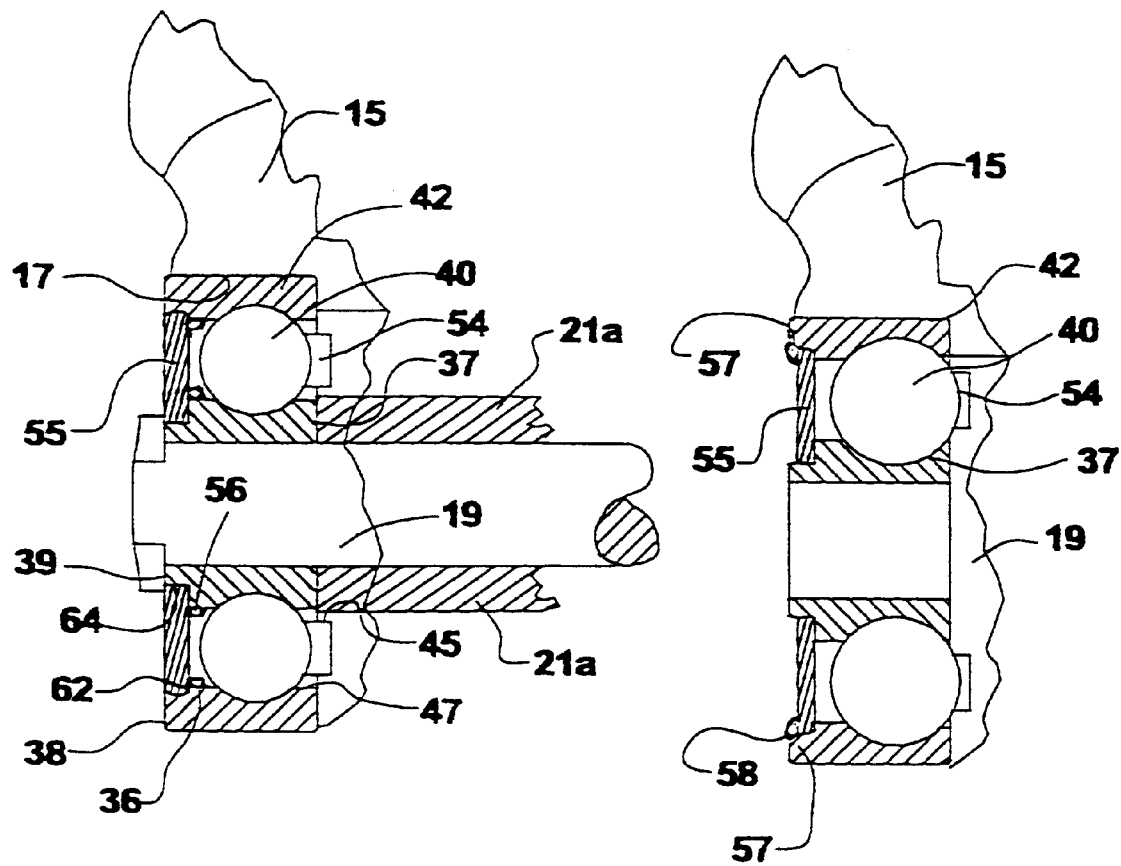
FIG. 8 is a cross sectional view taken along lines 5—5 of FIG. 4 illustrating a snap-in sealing cap and the bearing retaining cage protruding into the interior space.

When the wheel assembly 11 is assembled, the interior ends 41,43 are exposed to the interior space 19 of the hub 15. As shown in FIGS. 8 and 9, the bearing retaining cage 54 may extend into the interior space 19 if desired. Also, the ball bearing size may be increased to the extent that their spherical surfaces extend into the interior space 19. Hence, by offsetting the ball bearings 40 from midpoint 52 towards the interior ends 41,43 and allowing the ball bearings 40 and/or bearing retaining cage 54 to extend into the interior space 19, larger and fewer bearings can be utilized.

Another way to increase the ball size is to eliminate the distal ends 23 of the spacer 18 and have a modified spacer 21a that fits between two bearing assemblies 35. An axle 20 then fits within inner race 37 and through center spacer 21a. This set up also reduces manufacturing tolerance buildup.

The invention has been described in an illustrative manner, and it is to be understood that the terminology which has been used is intended to be in the nature of words of description rather than of limitation.

Other variations and modifications of the present invention are possible in light of the above teachings. It is, therefore, to be understood that within the scope of the appended claims wherein reference numerals are merely for convenience and are not to be in any way limiting, the invention may be practiced otherwise than specifically described.

The embodiments in which an exclusive property or privilege is claimed are defined as follows:

1. A bearing assembly for use in wheels for in-line roller skates and skateboards, said bearing assembly comprising:
    an outer race having an inner diameter surface, said outer race having an exterior end and an interior end, said inner diameter surface having an annular groove with its annular center offset from a midpoint of said outer race;
    an inner race concentric with said outer race, said inner race having an outer diameter surface, said inner race having a second exterior end and a second interior end, said outer diameter surface having a second annular groove with its annular center offset from a midpoint of said inner race, said second annular groove of said inner race being in alignment with said annular groove of said outer race;
    a plurality of bearings disposed between said annular groove and said second annular groove respectively of said outer and inner races;
    a cage adapted to retain said plurality of bearings in an equally spaced apart manner, said cage positioned at said interior ends of said inner and outer races;
    a sealing cap disposed between said inner and outer races at said exterior ends; and
    said interior ends of said inner and outer races define a plane, said plane intersecting said cage with said cage protruding axially outside of said races.

2. A bearing assembly for use in wheels for in-line roller skates and skateboards, said bearing assembly comprising:
    an outer race having an inner diameter surface, said outer race having an exterior end and an interior end, said inner diameter surface having an annular groove with its annular center offset from a midpoint of said outer race;
    an inner race concentric with said outer race, said inner race having an outer diameter surface, said inner race having a second exterior end and a second interior end, said outer diameter surface having a second annular groove with its annular center offset from a midpoint of said inner race, said second annular groove of said inner race being in alignment with said annular groove of said outer race;
    a plurality of bearings disposed between said annular groove and said second annular groove respectively of said outer and inner races;
    a cage adapted to retain said plurality of bearings in an equally spaced apart manner, said cage positioned at said interior ends of said inner and outer races;
    a sealing cap disposed between said inner and outer races at said exterior ends; and
    said plurality of ball bearings further include respective spherical surfaces, said interior ends of said inner and outer races defining a plane, said plane intersecting said spherical surfaces with said spherical surfaces protruding axially outside of said races.

3. A wheel and bearing assembly for use in wheels for in-line roller skates and skateboards, said wheel and bearing assembly comprising:
    a wheel having an exterior surface and a hub, said hub having a pair of oppositely positioned annular bearing recesses and an interior space therebetween;
    a centerbearing spacer disposed through said bearing recesses and interior space;
    a first bearing assembly, said bearing assembly having an interior end, an exterior end, and a bearing cavity disposed therebetween said bearing cavity having a plurality of bearings, a sealing cap adapted to be attached to said exterior end, a bearing retainer cage located at said interior end and adapted to be attached to and retain said plurality of bearings;
    a second bearing assembly, said bearing assembly having an interior end, an exterior end, and a bearing cavity disposed therebetween said bearing cavity having a plurality of bearings, a sealing cap adapted to be attached to said exterior end, a bearing retainer cage located at said interior end and adapted to be attached to and retain said plurality of bearings;
    said first and second bearing assemblies positioned in said opposite annular bearing recesses of said wheel whereby said bearings and bearing retaining cage of each of said first and second bearings are exposed to the interior space and said sealing cap on each of said first and second bearings seal the bearings from the exterior end of said wheel;

wherein at least one of said first and said second bearing assemblies further includes an inner race and an outer race, said outer race having an inner diameter surface, said inner diameter surface having an annular groove with its annular center offset from a midpoint of said outer race, said inner race concentric with said outer race, said inner race having an outer diameter surface, said outer diameter surface having an second annular groove with its annular center offset from a midpoint of said inner race, said second annular groove of said inner race being in alignment with said annular groove of said outer race;

said plurality of bearings in said respective bearing assembly disposed between said annular groove and said second annular groove respectively of said outer and inner races;

said cage of said respective bearing assembly adapted to retain said plurality of bearings in an equally spaced apart manner, said cage positioned at said interior ends of said inner and outer races;

said sealing cap of said respective bearing assembly disposed between said inner and outer races at said exterior ends; and said interior ends of said inner and outer races define a plane, said plane intersecting said cage with said cage protruding axially outside of said races into said interior space.

4. A wheel and bearing assembly for use in wheels for in-line roller skates and skateboards, said wheel and bearing assembly comprising:

a wheel having an exterior surface and a hub, said hub having a pair of oppositely positioned annular bearing recesses and an interior space therebetween;

a centerbearing spacer disposed through said bearing recesses and interior space;

a first bearing assembly, said bearing assembly having an interior end, an exterior end, and a bearing cavity disposed therebetween said bearing cavity having a plurality of bearings, a sealing cap adapted to be attached to said exterior end, a bearing retainer cage located at said interior end and adapted to be attached to and retain said plurality of bearings;

a second bearing assembly, said bearing assembly having an interior end, an exterior end, and a bearing cavity disposed therebetween said bearing cavity having a plurality of bearings, a sealing cap adapted to be attached to said exterior end, a bearing retainer cage located at said interior end and adapted to be attached to and retain said plurality of bearings;

said first and second bearing assemblies positioned in said opposite annular bearing recesses of said wheel whereby said bearings and bearing retaining cage of each of said first and second bearings are exposed to the interior space and said sealing cap on each of said first and second bearings seal the bearings from the exterior end of said wheel;

wherein at least one of said first and said second bearing assemblies further includes an inner race and an outer race, said outer race having an inner diameter surface, said inner diameter surface having an annular groove with its annular center offset from a midpoint of said outer race, said inner race concentric with said outer race, said inner race having an outer diameter surface, said outer diameter surface having an second annular groove with its annular center offset from a midpoint of said inner race, said second annular groove of said inner race being in alignment with said annular groove of said outer race;

said plurality of bearings in said respective bearing assembly disposed between said annular groove and said second annular groove respectively of said outer and inner races;

said cage of said respective bearing assembly adapted to retain said plurality of bearings in an equally spaced apart manner, said cage positioned at said interior ends of said inner and outer races;

said sealing cap of said respective bearing assembly disposed between said inner and outer races at said exterior ends; and said plurality of ball bearings further include respective spherical surfaces, said interior ends of said inner and outer races defining a plane, said plane intersecting said spherical surfaces with said spherical surfaces protruding axially outside of said races into said interior space.

5. A bearing assembly for use in wheels for in-line roller skates and skateboards, said bearing assembly comprising:

an outer race having an exterior end and an interior end, said outer race having a midpoint;

an inner race concentric with said outer race, said inner race having a second exterior end and a second interior end, said outer race having a midpoint; and a plurality of bearings disposed between outer and inner races whereby said plurality of ball bearings are offset from a midpoint of one of said inner and outer races;

wherein said bearings are five ball bearings; and said plurality of ball bearings further include respective spherical surfaces, said spherical surfaces protruding axially outside of said races and into said interior space.

6. A bearing assembly for use in wheels for in-line roller skates and skateboards, said bearing assembly comprising:

an outer race having an exterior end and an interior end, said outer race having a midpoint;

an inner race concentric with said outer race, said inner race having a second exterior end and a second interior end, said outer race having a midpoint; and a plurality of bearings disposed between outer and inner races whereby said plurality of ball bearings are offset from a midpoint of one of said inner and outer races;

a cage adapted to retain said plurality of bearings in an equally spaced apart manner, said cage positioned at said interior ends of said inner and outer races; and wherein said cage protrudes axially outside of said races and into said interior space.

* * * * *